(12) United States Patent
McInerney et al.

(10) Patent No.: US 11,709,886 B2
(45) Date of Patent: *Jul. 25, 2023

(54) PERSONALIZING EXPLAINABLE RECOMMENDATIONS WITH BANDITS

(71) Applicant: Spotify AB, Stockholm (SE)

(72) Inventors: James E. McInerney, Jersey City, NJ (US); Benjamin Lacker, Brooklyn, NY (US); Samantha Hansen, New York, NY (US); Alois Gruson, New York, NY (US); Rishabh Mehrotra, London (GB); Hugues Bouchard, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,773

(22) Filed: Mar. 7, 2022

(65) Prior Publication Data

US 2022/0237226 A1    Jul. 28, 2022

Related U.S. Application Data

(63) Continuation of application No. 16/502,975, filed on Jul. 3, 2019, now Pat. No. 11,301,513.

(Continued)

(51) Int. Cl.
*G06F 16/00* (2019.01)
*G06F 16/635* (2019.01)
(Continued)

(52) U.S. Cl.
CPC .......... *G06F 16/637* (2019.01); *G06F 16/639* (2019.01); *G06F 18/217* (2023.01)

(58) Field of Classification Search
CPC .. G06F 16/637; G06F 16/639; G06F 16/9535; G06K 9/6262; G06N 3/08; G06N 3/006; G06N 20/00; G06N 5/045
See application file for complete search history.

(56) References Cited

U.S. PATENT DOCUMENTS 9,836,765 B2 * 12/2017 Hariri ................ G06Q 30/0631
10,140,623 B1 * 11/2018 Lloyd ................ G06Q 30/0205
(Continued)

FOREIGN PATENT DOCUMENTS

AU    2012283930    2/2014
WO    2013/126589    8/2013

OTHER PUBLICATIONS

"Explanations in recommender systems", UCI Math, Chapter 6 Slides (2012). Available at: https://www.math.uci.edu/camp/courses/math77b/lecture_12w/pdfs/Chapter%20-06%20-%20Explanations%20in%20recommender%20systems.pdf.
(Continued)

*Primary Examiner* — Jared M Bibbee
(74) *Attorney, Agent, or Firm* — Merchant & Gould, P.C.

(57) ABSTRACT

Methods, systems and computer program products are provided personalizing recommendations of items with associated explanations. The example embodiments described herein use contextual bandits to personalize explainable recommendations ("recsplanations") as treatments ("Bart"). Bart learns and predicts satisfaction (e.g., click-through rate, consumption probability) for any combination of item, explanation, and context and, through logging and contextual bandit retraining, can learn from its mistakes in an online setting.

62 Claims, 4 Drawing Sheets

Related U.S. Application Data

(60) Provisional application No. 62/694,815, filed on Jul. 6, 2018.

(51) Int. Cl.
  G06F 16/638 (2019.01)
  G06F 18/21 (2023.01)

(56) References Cited

U.S. PATENT DOCUMENTS

| | | | | |
|---|---|---|---|---|
| 10,332,015 | B2* | 6/2019 | Kawale | G06F 17/16 |
| 10,936,961 | B1* | 3/2021 | Jain | G06N 7/005 |
| 11,301,513 | B2 | 4/2022 | McInerney | |
| 2009/0222398 | A1* | 9/2009 | Allen | G06N 5/045 |
| | | | | 706/45 |
| 2011/0010321 | A1 | 1/2011 | Pachet et al. | |
| 2011/0131077 | A1* | 6/2011 | Tan | G06Q 30/02 |
| | | | | 705/347 |
| 2011/0153663 | A1* | 6/2011 | Koren | H04N 21/6582 |
| | | | | 707/E17.039 |
| 2012/0016642 | A1* | 1/2012 | Li | G06Q 30/02 |
| | | | | 703/2 |
| 2012/0095863 | A1* | 4/2012 | Schiff | G06Q 30/0282 |
| | | | | 705/26.7 |
| 2012/0246209 | A1 | 9/2012 | Pachet et al. | |
| 2013/0024464 | A1* | 1/2013 | Berner | G06F 16/951 |
| | | | | 707/E17.084 |
| 2014/0279209 | A1* | 9/2014 | Hoshino | G06F 16/68 |
| | | | | 705/26.7 |
| 2014/0316930 | A1* | 10/2014 | Jain | G06Q 30/0631 |
| | | | | 705/26.5 |
| 2015/0006457 | A1* | 1/2015 | Lambert | G06N 5/00 |
| | | | | 706/46 |
| 2015/0051973 | A1* | 2/2015 | Li | G06Q 30/02 |
| | | | | 705/14.53 |
| 2015/0262069 | A1* | 9/2015 | Gabriel | G06F 16/9535 |
| | | | | 706/48 |
| 2016/0026918 | A1* | 1/2016 | Barbieri | H04L 67/535 |
| | | | | 706/11 |
| 2016/0132601 | A1* | 5/2016 | Nice | G06F 16/9535 |
| | | | | 707/754 |
| 2016/0189028 | A1* | 6/2016 | Hu | G06F 3/04842 |
| | | | | 706/46 |
| 2016/0189042 | A1* | 6/2016 | Gill | G06F 3/04817 |
| | | | | 706/11 |
| 2016/0225063 | A1* | 8/2016 | Wical | G06Q 30/0631 |
| 2016/0328409 | A1* | 11/2016 | Ogle | G06Q 30/0631 |
| 2017/0103413 | A1* | 4/2017 | He | G06Q 30/0244 |
| 2017/0161818 | A1* | 6/2017 | Jain | G06F 16/9535 |
| 2018/0108048 | A1* | 4/2018 | Yoon | G06Q 30/0271 |
| 2018/0182015 | A1* | 6/2018 | Su | G06N 20/10 |
| 2018/0189391 | A1* | 7/2018 | Ip | G06F 16/639 |
| 2018/0310115 | A1* | 10/2018 | Romigh | H04S 3/008 |
| 2019/0073606 | A1* | 3/2019 | Columbia-Walsh | G06N 20/00 |
| 2019/0354805 | A1* | 11/2019 | Hind | G06V 10/764 |

OTHER PUBLICATIONS

Abdollahpouri, H. et al., "Towards Effective Exploration/Exploitation in Sequential Music Recommendation", ReeSys 2017 Poster Proceedings, Aug. 27-31, Como, Italy (2017).
Agarwal et al., "Counterfactual Learning-to-Rank for Additive Metrics and Deep Models", arXiv preprint arXiv:1805.00065 (2018).
Arya et al., "Candidate Selection for Large Scale Personalized Search and Recommender Systems", SIGIR'17, Aug. 7-11, Shinjuku, Tokyo, Japan (2017).
Barraza-Urbina, "The exploration-exploitation trade-off in interactive recommender systems", Proceedings of the Eleventh ACM Conference on Recommender Systems (2017).
Brewer et al., "Explanation in Scientists and Children", Minds and Machines, 8:119-136 (1998).
Cao et al., "Embedding Factorization Models for Jointly Recommending Items and User Generated Lists", SIGIR'17, Aug. 7-11, Shinjuku, Tokyo, Japan, pp. 585-594 (2017).
Celis, "An Algorithmic Framework to Control Bias in Bandit-based Personalization", arXiv preprint arXiv:1802.08674 (2018).
Chaney et al., "How Algorithmic Confounding in Recommendation Systems Increases Homogeneity and Decreases Utility", Proceedings of the 12th ACM Conf. on Recommender Systems, pp. 224-232 (2018).
Cohen et al., "Expediting Exploration by Attribute-to-Feature Mapping for Cold-Start Recommendations", RecSys'17, Aug. 27-31, Como, Italy (2017).
Covington et al., "Deep Neural Networks for YouTube Recommendations", Proceedings of the 10th ACM conf. on recommender systems (2016).
Cunha et al., "Metalearning for Context-aware Filtering: Selection of Tensor Factorization Algorithms", RecSys'17, Aug. 27-31, Como, Italy (2017).
De Boom et al., "Large-Scale User Modeling with Recurrent Neural Networks for Music Discovery on Multiple Time Scales", Multimedia Tools and Applications 77.12: 15385-15407 (2018).
Freno, "Practical Lessons from Developing a Large-Scale Recommender System at Zalando", Proceedings of the Eleventh ACM Conf. on Recommender Systems, pp. 251-259 (2017).
Friedrich et al., "A Taxonomy for Generating Explanations in Recommender Systems", AI Magazine 32.3: pp. 90-98 (2011).
Jiang et al., "Optimizing Slate Recommendations via Slate-CVAE." arXiv preprint arXiv:1803.01682 (2018).
Kouki et al., "User Preferences for Hybrid Explanations", RecSys'17, Aug. 27-31, Como, Italy (2017).
Li et a., "A Contextual-Bandit Approach to Personalized News Article Recommendation", Proceedings of the 19th int'l conf. on World wide web, pp. 661-670 (2010).
Li et al., "Unbiased Offline Evaluation of Contextual-bandit-based News Article Recommendation Algorithms", Proceedings of the fourth ACM int'l conf. on Web search and data mining, pp. 297-306 (2011).
Park et al., "A literature review and classification of recommender systems research", Expert systems with applications 39(11), pp. 10059-10072 (2012).
Prillo, "An elementary view on factorization machines", Proceedings of the Eleventh ACM Conf. on Recommender Systems, pp. 179-183 (2017).
Ricci et al., "Recommender Systems Handbook," doi:10.1007/978-0-387-85820-3 (2011).
Santu et al., "On application of learning to rank for e-commerce search", Proceedings of the 40th Int'l ACM SIGIR Conf. on Research and Development in Information Retrieval, pp. 475-484 (2017).
Schmit et al., "Human interaction with recommendation systems", arXiv preprint arXiv:1703.00535 (2017).
Schnabel et al., "Short-Term Satisfaction and Long-Term Coverage: Understanding How Users Tolerate Algorithmic Exploration", Proceedings of the Eleventh ACM International Conference on Web Search and Data Mining, pp. 513-521 (2018).
Sunehag et al., "Deep Reinforcement Learning with Attention for Slate Markov Decision Processes with High-Dimensional States and Actions", arXiv preprint arXiv:1512.01124 (2015).
Sutton et al., "Reinforcement Learning: An Introduction", Second edition in progress, The MIT Press (Bradford Book) (2014).
Swaminathan et al., "Off-policy evaluation for slate recommendation", Advances in Neural Information Processing Systems (2017).
Tang et al., "Ensemble Contextual Bandits for Personalized Recommendation", Proceedings of the 8th ACM Conf. on Recommender Systems, pp. 73-80 (2014).
Tang et al., "Personalized Recommendation via Parameter-Free Contextual Bandits", Proceedings of the 38th int'l ACM SIGIR conf. on research and development in information retrieval, pp. 323-332 (2015).
Tata et al., "Quick Access: Building a Smart Experience for Google Drive", Proceedings of the 23rd ACM SIGKDD Int'l Conf. on Knowledge Discovery and Data Mining, pp. 1643-1651 (2017).

(56) References Cited

OTHER PUBLICATIONS

Tintarev et al., "A Survey of Explanations in Recommender Systems", 2007 IEEE 23rd Int'l Conf. on data engineering workshop, IEEE (2007).
Tintarev, N., "Explanations of Recommendations", ReeSys '07: Proceedings of the 2007 ACM conference on Recommender systems (Oct. 2007).
Wang et al., "Beyond Ranking: Optimizing Whole-Page Presentation", Proceedings of the Ninth ACM Int'l Conf. on Web Search and Data Mining, pp. 103-112 (2016).
Wang et al., "Exploration in Interactive Personalized Music Recommendation: A Reinforcement Learning Approach", ACM Transactions on Multimedia Computing, Communications, and Applications (TOMM) vol. 2, No. 3, Article 1 (2013).
Wu et al., "Contextual bandits in a collaborative environment." Proceedings of the 39th Int'l ACM SIGIR conf. on Research and Development in Information Retrieval, pp. 529-538 (2016).
Zhang, Y. et al., "Explainable Recommendation: A Survey and New Perspectives", arXiv preprint arXiv:1804.11192 (2018).

\* cited by examiner

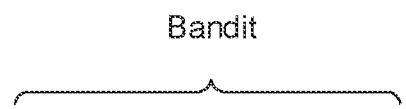
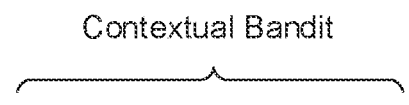
FIG. 5
FIG. 6
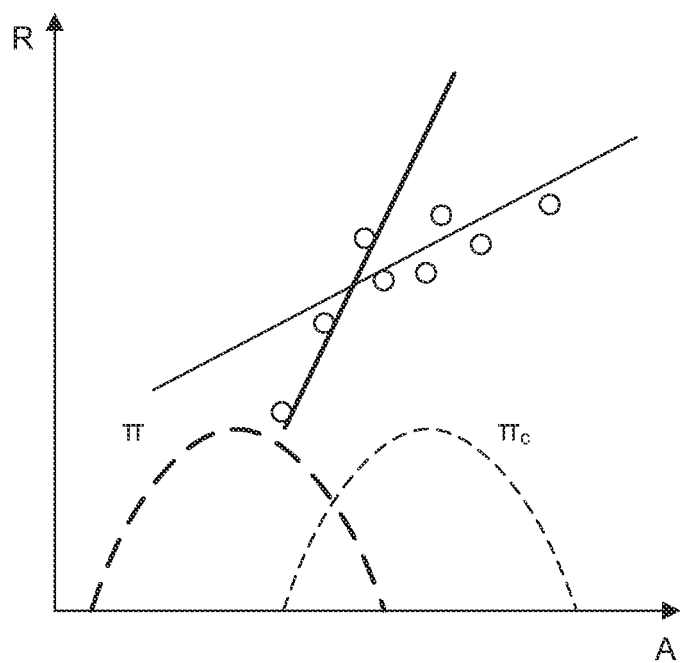
FIG. 7

PERSONALIZING EXPLAINABLE RECOMMENDATIONS WITH BANDITS

CROSS-REFERENCE TO RELATED APPLICATION

This application is a continuation of U.S. patent application Ser. No. 16/502,975, filed Jul. 3, 2019, which claims priority to U.S. Provisional Patent Application No. 62/694,815, filed Jul. 6, 2018, which are incorporated by reference herein in their entirety.

TECHNICAL FIELD

Example aspects described herein relate generally to media content-delivery systems, and more particularly to recommender systems that recommend content items for user consumption.

BACKGROUND

Recommender systems are central to the effectiveness of many online content and e-commerce platforms. Users are overwhelmed by the choice of what to watch, buy, read, and listen to online and recommendations are a popular way to help them navigate this choice. But recommendations without context lack motivation for a user to pay attention to them. Adding an associated explanation for a recommendation (abbreviated as "recsplanation") is known to increase user satisfaction and the persuasiveness of recommendations. Explanations in recommender systems serve as an additional type of information that can help users to better understand the system's output and promote objectives such as trust, confidence in decision making, or utility. They also encourage better outcomes such as higher user engagement resulting from more confidence and transparency in the recommendations.

Explanatory approaches for traditional systems usually rely on a single explanation style (e.g., collaborative, content, knowledge, utility, or social explanation styles). Existing works have also described utilizing user preferences for these single-style explanations. Various visualization techniques for explaining recommendations have been proposed as well, including interfaces with concentric circles, Venn diagrams, pathways between columns, tagcloud based explanations, among others.

Recent techniques consider the recommending procedure as sequential interactions between a user and a recommender agent, and use reinforcement learning to automatically learn the optimal actions. A contextual bandit approach has been used to provide personalized news article recommendations by modeling personalized recommendation of news articles as a contextual bandit problem.

In probability theory, the multi-armed bandit problem (sometimes called the K-[1] or N-armed bandit problem) is a problem in which a fixed limited set of resources must be allocated between competing (alternative) choices in a way that maximizes their expected gain, when each choice's properties are only partially known at the time of allocation, and may become better understood as time passes or by allocating resources to the choice. This is a classic reinforcement learning problem that exemplifies the exploration-exploitation tradeoff dilemma. The name comes from imagining a gambler at a row of slot machines (sometimes known as "one-armed bandits"), who has to decide which machines to play, how many times to play each machine and in which order to play them, and whether to continue with the current machine or try a different machine.

Users respond to explanations differently. For example, more social users may respond better to explanations that reference activity in their social network than more private users. The same users may respond to explanations differently according to their context and intent, e.g., people on the move may require more dependable recommendations from their recent consumption history due to lack of time.

One technical challenge with recommender systems involves optimizing both item selection and explanation selection. One reason this problem exists is that introducing explanations to recommendation greatly expands the search space of actions the recommender system can select from, compounding the problem of data sparsity. Recommendation methods that aim to maximize engagement without regard for model certainty or exploration can unnecessarily ignore highly relevant items. FIG. 1, for example, shows various outcomes when a recommender can only exploit or ignore an item (e.g., where the exploitative methods have two modes: (1) exploit an action and (2) ignore an action). When there is high certainty about the relevance of an item ("item relevance"), resulting from an abundance of data about the user-item match, a typical recommender behaves optimally. However, in the face of uncertainty from only a small amount of data, the recommender will sometimes suboptimally ignore relevant items (referring to FIG. 1, the lower left quadrant in the grid: High Relevance/Low Certainty). The fact that the recommender itself is active in deciding its own training data perpetuates this problem. Moreover, the problem of ignoring items or whole categories of items leads to so-called "filter bubble" pathologies.

What is needed therefore is a mechanism that reduces the uncertainty about the relevance of an item.

The aforementioned issues around item recommendation uncertainty also apply to explanation uncertainty. How to incorporate exploration when jointly optimizing for items and explanations is another gap in existing systems. Naïvely treating each [item, explanation] pair as a distinct action would multiplicatively scale the number of actions that need to be explored. In addition, in some cases the recommender is required to provide multiple items within the same explanation (e.g., in the shelf layout on a website). Accordingly, there is also needed a mechanism that reduces the uncertainty about the explanation surrounding recommendations.

BRIEF DESCRIPTION

The example embodiments described herein use contextual bandits to personalize explainable recommendations ("recsplanations") as treatments ("Bart") to address the aforementioned gaps in the following way. Generally, Bart learns and predicts satisfaction (e.g., click-through rate, consumption probability) for any combination of item, explanation, and context and, through careful logging and contextual bandit retraining, can learn from its mistakes in an online setting.

In one embodiment, there is provided a method for personalizing recommendations of items with associated explanations. The method includes collecting a plurality of user attributes and collecting, for each item of a plurality of items, at least one item attribute. The method further includes collecting implicit feedback data based on at least one activity associated with at least one of the plurality of items and training a reward model based on the plurality of user attributes, the at least one item attribute, the implicit feedback data, and a plurality of candidate explanations. In turn, the method provides defining, based on the reward model, a policy containing a distribution of explanations, a distribution of the plurality of items, and a probability that each of the plurality of items and explanations will be chosen and generating an ordering of selectable items and explanations using the policy.

In some embodiments, the method includes recording selection data at a time of selection of a selected item from the ordering of selectable items and explanations, the selection data including: at least one of the plurality of user attributes, the at least one item attribute, an item identifier, the implicit feedback data, and the probability that the policy placed on the chosen item and explanation for the selected item and updating the reward model with the recorded selection data.

In some embodiments the plurality of items is (i) a plurality of playlists, (ii) a plurality of songs, (iii) a plurality of albums, (iv) a plurality of artists, or any combination of (i), (ii), (iii), and (iv).

In some embodiments the policy is conditioned on the plurality of user attributes, the at least one item attribute and a predicted reward for each item and explanation.

In some embodiments, the activity is at least one of a playback action and a save action. This embodiment may include recording a playback length of the selected item.

In other embodiments, the method further includes setting, after the selection of the selected item, the probability of at least one non-optimal item and corresponding explanation to greater than zero (0).

In another example embodiment, there is provided a computer-readable medium having stored thereon sequences of instructions, the sequences of instructions including instructions which when executed by a computer system causes the computer system to perform the method of any one of the methods described herein.

In yet another example embodiment, there is provided a system for personalizing recommendations of items with associated explanations. The system includes a user attribute database adapted to collect a plurality of user attributes and an item attribute database adapted to collect, for each item of a plurality of items, at least one item attribute. The system further includes an implicit feedback database adapted to collect implicit feedback data based on at least one activity associated with at least one of the plurality of items and at least one processor adapted to: train a reward model based on the plurality of user attributes, the at least one item attribute, the implicit feedback data, and a plurality of candidate explanations; define, based on the reward model, a policy containing a distribution of explanations, a distribution of the plurality of items, and a probability that each of the plurality of items and explanations will be chosen; and generate an ordering of selectable items and explanations using the policy.

In some embodiments, the system further includes a user activity log adapted to record selection data at a time of selection of a selected item from the ordering of selectable items and explanations, the selection data including: at least one of the plurality of user attributes, the at least one item attribute, an item identifier, the implicit feedback data, and the probability that the policy placed on the chosen item and explanation for the selected item; and the at least one processor further adapted to update the reward model with the recorded selection data.

In some embodiments, the plurality of items is (i) a plurality of playlists, (ii) a plurality of songs, (iii) a plurality of albums, (iv) a plurality of artists, or any combination of (i), (ii), (iii), and (iv).

In some embodiments, the policy is conditioned on the plurality of user attributes, the at least one item attribute and a predicted reward for each item and explanation.

In some embodiments, the activity is at least one of a playback action and a save action. A user activity log may be provided to record a playback length of the selected item.

The at least one processor may further be adapted to set, after the selection of the selected item, the probability of at least one non-optimal item and corresponding explanation to greater than zero (0).

BRIEF DESCRIPTION OF THE DRAWINGS

The features and advantages of the example embodiments of the invention presented herein will become more apparent from the detailed description set forth below when taken in conjunction with the following drawings.

FIG. 5 depicts a graphical model notation of multi-armed bandit (MAB).

FIG. 6 depicts a graphical model notation of a contextual multi-armed bandit.

FIG. 7 illustrates an example of how an off-policy training fits a reward that best fits input points with respect to a target policy $\pi$ using input points generated by a collection policy $\pi_c$, according to an example embodiment of the present invention.

DETAILED DESCRIPTION

As explained above, one technical problem that is addressed by the embodiments described herein is how to jointly personalize recommendations of items with their associated explanation. Generally, personalization is based on contextual features describing the user, their context, and an item. More specifically, contextual bandits are used to personalize explainable recommendations ("recsplanations") as treatments ("Bart"). Bart learns and predicts satisfaction (e.g., click-through rate, consumption probability) for any combination of item, explanation, and context and, through careful logging and contextual bandit retraining, can learn from its mistakes in an online setting.

Figure 2:
FIG. 2 shows various outcomes when a recommender according to the example embodiments described herein are used to exploit, ignore, or explore an action.

FIG. 2 shows various outcomes when a recommender according to the example embodiments described herein are used to exploit, ignore, or explore an action. The Bandit approach introduces the notion of exploration to reduce the uncertainty (e.g., low certainty vs. high certainty in FIG. 2) about the relevance of an item (e.g., low/high relevance in FIG. 2). By reserving judgement about item relevance until enough data has been collected, the so-called "bandit" is able to discover more relevant items (e.g., the lower left quadrant of FIG. 2).

Figure 3:
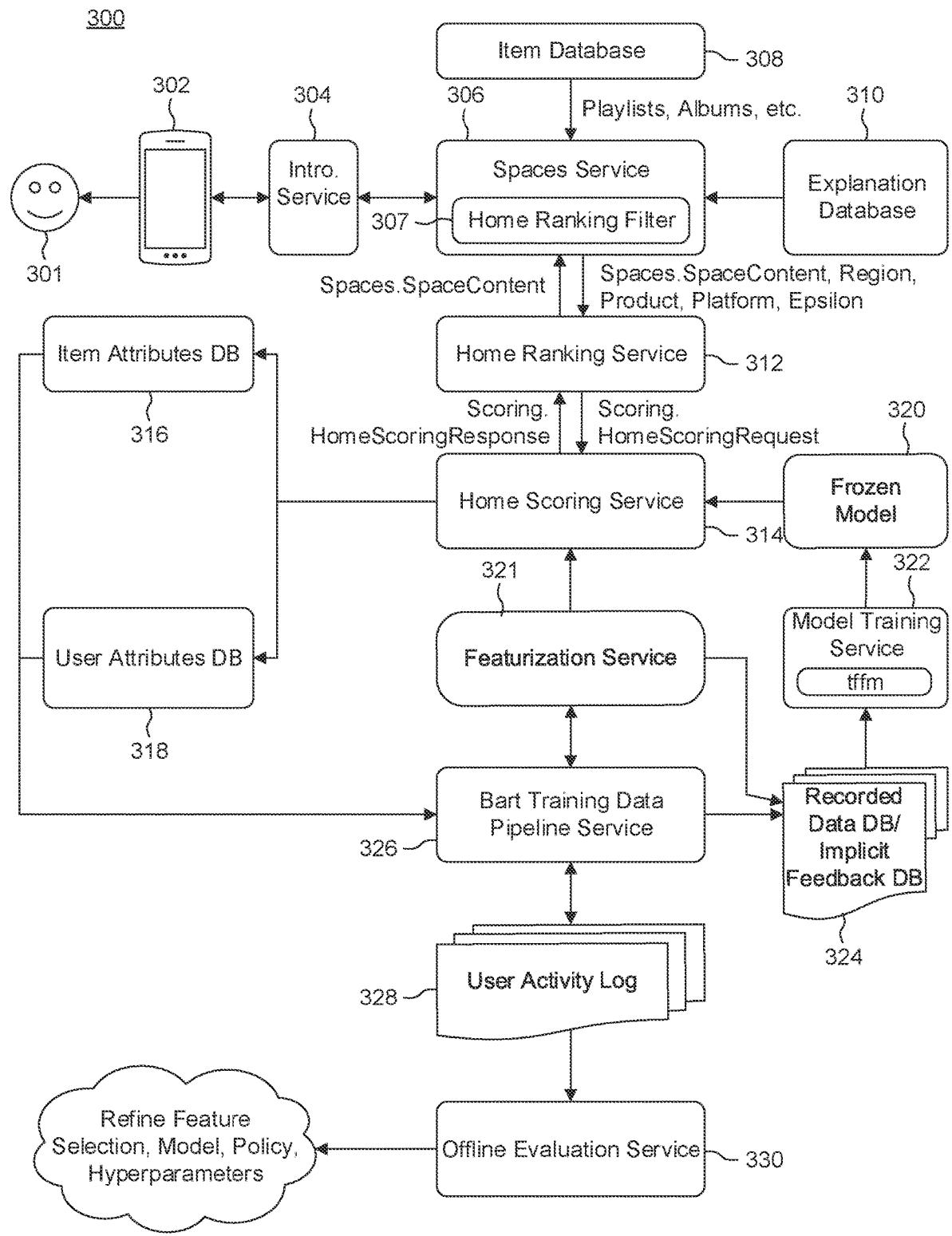
FIG. 3 depicts an example architecture of a system for personalizing recommendations of items with associated explanations in accordance with some embodiments of the present invention.

FIG. 3 depicts an example architecture of a system 300 for personalizing recommendations of items with associated explanations in accordance with some embodiments of the present invention. The system includes an introduction ("intro") service 304, a spaces service 306, an item database 308, an explanation database 310, a home ranking service 312, a home scoring service 314, an item attributes database 316, a user attributes database 318, a featurization service 321, a recorded data database/implicit feedback database 324, a Bart training data pipeline service 326, and an offline evaluation service 330.

A device 302 having a processor for executing applications is provided. The device includes a user interface that allows a user to control which application is executed. In an example embodiment, the device is configured to receive input, for example from a user 301, to open a home tab of a media content delivery service (not shown). This can be performed by, for example, selecting an application presented on a display of device 302. The selection is received by device 302, which is in communication with the media content delivery service. In turn, device 302 calls an intro service 304. The intro service 304 provides to the device 302 the media device pages containing selectable items. Candidates include item candidates that are stored in item database 308 and explanation candidates which are stored in explanation database 310. Intro service 304 calls the spaces service 306 which pulls in candidate items and explanation items from an item database 308 and an explanation database 310, respectively.

Spaces service 306, in turn, selects a subset of the candidate items or explanation items to use. Within the spaces service 306 there is defined a home ranking filter 307 which in conjunction with home ranking service 312 provides a ranking of the candidate items and explanation items. In some embodiments, the home ranking service 312 is configured to decide an order of how the candidate items and explanation items are displayed on device 302 (e.g., a shelve order and a playlist order).

Home scoring service 314, also referred to sometimes as a reward service, generates a predicted stream rate per item (e.g., playlist). A frozen model 320 is fed to home scoring service 314. In turn, frozen model 320 is implemented using corresponding parameters. A model training service 322 trains the model using plural user attributes stored in user attributes database 318, at least one item attribute stored in item attributes database 316, implicit feedback data stored in or derived from, (depending on the implementation) user activity log 328, and plural candidate explanations obtained from the spaces service 306. A Bart training data pipeline service 326 is used to combine the training data and feed the combined training data to recorded data database/implicit feedback database 324 (i.e., a training database). The combined training data (stored in recorded data database/implicit feedback database 324) includes the context data at the time of a home impression and user behavior at the time which is, for example, obtained from user activity log 328. In some embodiments, the implicit feedback is stored in recorded data database/implicit feedback database 324. Recorded data database/implicit feedback database 324 can also be configured to contain all the featurized user data and item data. In an example embodiment, the featurized user data and item data are logged immediately and later joined with a slightly delayed feedback (e.g. consumption time for the recommended item). The first place the implicit feedback appears in this embodiment would be in recorded data database/ implicit feedback database 324. TensorFlow factorization machine (tffm) is an implementation of a factorization machine in TensorFlow. In some embodiments TensorFlow is a package that model training service 322 uses. Item attributes database 316 and user attributes database 318 feed item attribute data and user attribute data to a Bart training data pipeline service 326 and, in turn, are featurized by featurization service 321. The features generated by featurization service 321 generate a context in a form that can be fed into home scoring service 314. The featurized data can be in, for example, the form of a vector. Offline evaluation service 330 is used to evaluate new models and ways of training.

In an example embodiment, system 300 provides personalized recommendations of items with associated explanations. System includes a user attributes database 318 adapted to collect a plurality of user attributes and an item attributes database 316 adapted to collect, for each item of a plurality of items, at least one item attribute. The system 300 further includes an implicit feedback database adapted to collect implicit feedback data based on at least one activity associated with at least one of the plurality of items and at least one processor adapted to: train a reward model based on the plurality of user attributes, the at least one item attribute, the implicit feedback data, and a plurality of candidate explanations; define, based on the reward model, a policy containing a distribution of explanations, a distribution of the plurality of items, and a probability that each of the plurality of items and explanations will be chosen; and generate an ordering of selectable items and explanations using the policy.

In some embodiments, system 300 further includes a user activity log 328 adapted to record selection data at a time of selection of a selected item from the ordering of selectable items and explanations, the selection data including: at least one of the plurality of user attributes, the at least one item attribute, an item identifier, the implicit feedback data, and the probability that the policy placed on the chosen item and explanation for the selected item; and the at least one processor further adapted to update the reward model with the recorded selection data.

In some embodiments, the plurality of items is (i) a plurality of playlists, (ii) a plurality of songs, (iii) a plurality of albums, (iv) a plurality of artists, or any combination of (i), (ii), (iii), and (iv).

In some embodiments, the policy is conditioned on the plurality of user attributes, the at least one item attribute and a predicted reward for each item and explanation.

In some embodiments, the activity is at least one of a playback action and a save action. A user activity log 328 may be provided to record a playback length of the selected item.

The at least one processor may further be adapted to set, after the selection of the selected item, the probability of at least one non-optimal item and corresponding explanation to greater than zero (0).

It should be understood that not all of the above-described components are required to practice the invention, and variations in the arrangement and type of the components may be made without departing from the spirit or scope of the invention. Also, as used herein, the term "service" is applied to describe a specific structure for performing specific associated functions, such as a special purpose computer as programmed to perform algorithms (e.g., processes) disclosed herein. The service can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Figure 1:
FIG. 1 shows the various outcomes when a recommender can only exploit or ignore an item.
Figure 4:
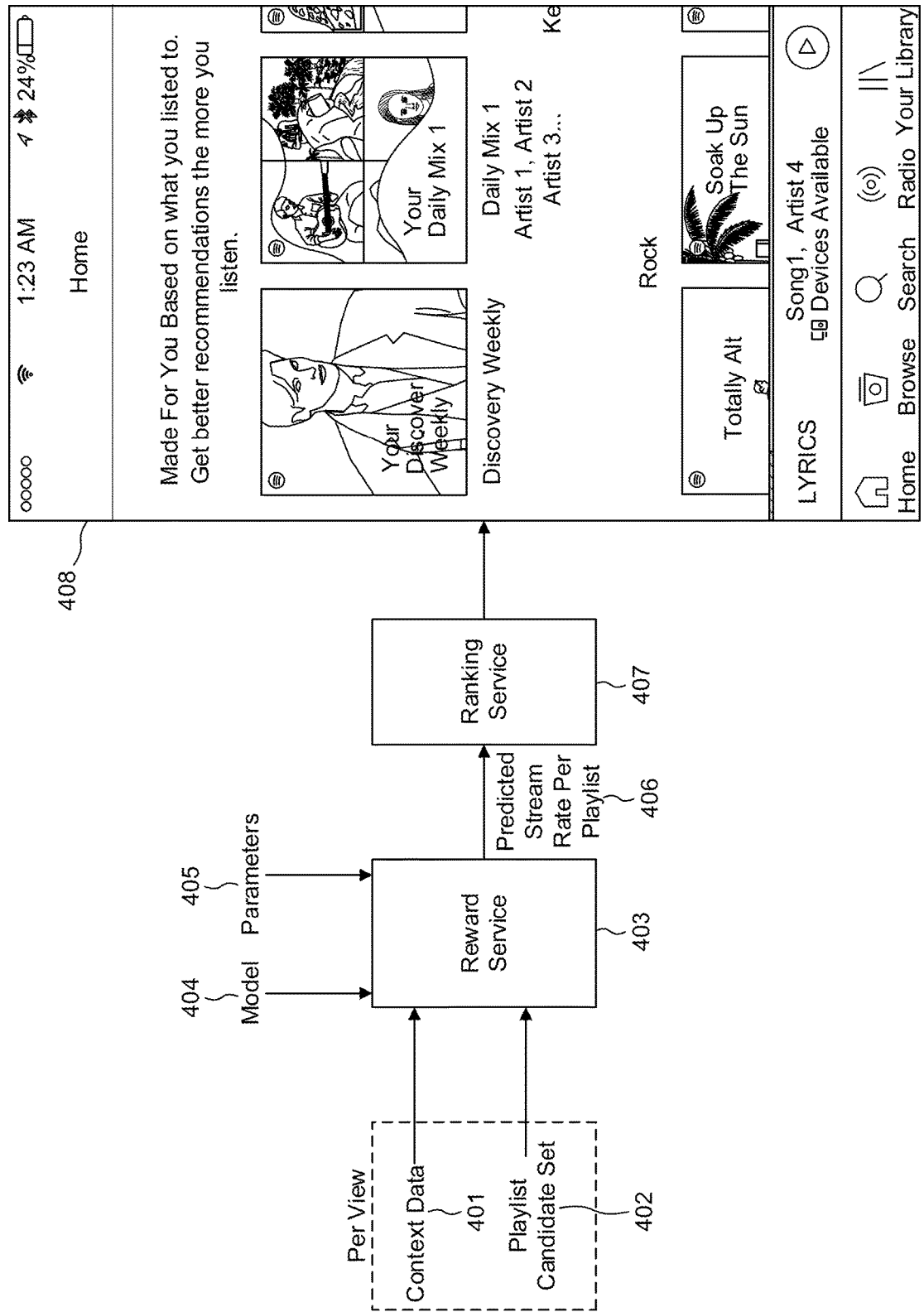
FIG. 4 depicts a functional flow diagram of a system for personalizing recommendations of items with associated explanations in accordance with some embodiments of the present invention.

FIG. 4 depicts a functional flow diagram of a system for personalizing recommendations of items with associated explanations in accordance with some embodiments of the present invention. As shown in FIG. 4, a reward service 403 is fed context data 401 and a playlist candidate set 402. Reward service 403 operates in conjunction with a model 404 and various parameters 405 to generate a predicted stream rate per playlist 406. The predicted stream rate per playlist 406 is fed to a ranking service 407 which, in turn, outputs selectable playlists and explanations to a display 408 of a device (e.g., device 302 of FIG. 1).

Context data 401 is described in more detail below in connection with the problem formulation and description of Bart (e.g., variable x). The playlist candidate set 402 is described in more detail below in connection with the description of offline evaluation. Reward service 403 and the model 404 are described below in more detail in connection with the description of a context and reward model. Parameters 405 are described below in more detail in connection with the description of off-policy training. Predicted stream rate per playlist 406 is described below in more detail below in connection with the description of context and reward model. Ranking service 407 is described below in more detail in connection with the description of an exploration-exploitation policy and propensity scoring.

Table 1 below provides a summary of symbols used in describing the example embodiments.

TABLE 1

| Symbol | Meaning |
| --- | --- |
| j∈J | Item to be recommended |
| e∈E | Explanation for an item |
| u∈U | User |
| x∈X | Context, such as user and item attributes |
| f(e, u) | Validity function for explanation e and use u |
| θ | Coefficients in logistic regression |
| v | Set of embeddings in factorization machine |
| X | Context as a random variable |
| A | Action (i.e. recommendation and explanation) as a random variable |
| R | Reward as a random variable (e.g. binary consumption indicator) |
| $x_n$ | Observed context for data point n |
| $a_n$ | Action performed for data point n |
| $r_n$ | Observed reward for data point n |
| N | Total number of data points |
| D | Dimensionality of context |
| π | Policy distribution over actions |
| $π_c$ | Collection policy used to college the training data, also known as the propensity score |
| $r^{(t)}$ | Reward model with $t^{th}$ order interactions |

Problem Formulation

The problem is formalized as follows. Let J be the set of items (j), U be the set of users (u), and E the set of explanations (e). A validity function is introduced to map any pair of elements e∈E and u∈U to a subset of J according to the follow equation:

$$f : E \times U \rightarrow P(J) \quad (1)$$

In other words, $f$ describes the set of all valid items $v_{e,u} \subseteq J$ for each explanation and user. In some embodiments, $f$ has been pre-specified. This admits a large number of possible explanations through rules that are parameterized.

Table 2 below provides several examples of rules that can scalably cover the entire item set J and explanation set E through parameterization. In other words, it illustrates examples of simple parameterized rules for specifying the validity function $f$. It should be understood that because $f$ is not restricted to be injective, there may be more than one explanation for the same item. Some of the rules in Table 2 assume side information that is commonly accessible, such as a way of finding similar artists through a graph or embedding representation.

TABLE 2

| Parameterized Explanation | Rule for Generating Items | Example P's |
| --- | --- | --- |
| Movies your friends love | Movies that are popular with P's friends | {$user_{123}$, $user_{921}$} |
| More like P | Playlists by artists similar to P | {Artist 1, Artist 2, Artist 3} |
| Jump back in | Book genres that a user consumed heavily 6 months ago | ∅ |

Building on these definitions, the problem addressed is that of raising processing efficiency (an hence power conservation) by efficiently building a machine learning approach that sorts both explanations and items in a personal, dynamic, responsive, and relevant fashion.

A reward function according to equation 2 below is sought that accurately predicts the user engagement for item j∈J, explanation e∈E, given context x∈X.

$$r : J \times E \times X \rightarrow R \quad (2)$$

The training optimizes the learning objective (which is related to the accuracy of the predicted reward) with respect to the free parameters of r.

In addition, given a reward function, a method is provided for selecting an item-explanation pair (j, e) to present to the user. The presentation of an item-explanation pair (j, e) is referred to herein as an action, in line with bandit terminology. Choosing the optimal action according to equation 3 below:

$$(j^*, e^*) = \arg_{j,e} \max r(j, e, x) \quad (3)$$

In any particular context, x is the exploitative action. Exploiting at every time step is not necessarily optimal in the long run due to the fact that r is only an estimator of the true reward function. Therefore a policy $π(•|x)$ is sought that is a distribution over actions from which the bandit samples each action in response to the context.

With this definition of the technical problem to be solved, presented next is a more detailed description of Bart, a contextual bandits approach to recommending with explanations.

Bart

Generally, Bart learns how items and explanations interact within any given context to predict user satisfaction. It does this in a reinforcement learning setting where it must decide which actions to take next to gather feedback. An effective model of satisfaction is built from sparse inputs and the contextual bandit framework is used to manage exploration and training.

A multi-armed bandit (MAB) maintains a model of the reward R which is conditioned on the choice of action A. The choice of A depends only on the history of actions and rewards up to the current time step according to equation 4 below:

$$D_n = \{(a_1, r_1), \ldots, (a_n, r_n)\}. \quad (4)$$

The goal of MAB is to choose actions that maximize the total sum of rewards according to equation 5 below:

$$\Sigma_{n=1}^N r_n, \quad (5)$$

This problem is reduced to that of: (1) maintaining an accurate belief about the reward of each action; and (2) creating a distribution over actions (i.e., a policy) that effectively balances exploitation (choosing high reward actions) and exploration (finding high reward actions).

There exist several frameworks for creating a distribution over actions (i.e., (2) above) to varying degrees of sophistication, such as epsilon-greedy, upper confidence bound, and Thompson sampling.

FIG. 5 depicts a graphical model notation of multi-armed bandit (MAB), summarizing the assumptions of the reward model in the MAB. These assumptions are used to maintain a reward belief for each action, e.g., by calculating the posterior distribution given a history of action-reward data or maintaining a mean and variance estimate for each action.

A criticism of the standard MAB is that it ignores contextual information, denoted by X that could affect the reward. For example, in recommendation, the context may include user features, item features, time of day, platform etc. This motivates collecting and observing X before each action and making the choice of which action to take dependent on X. This is known as a contextual bandit and is illustrated in FIG. 6.

Three elements to the contextual bandit are: the context, reward model, and exploration-exploitation policy, each of which will now be described in more detail.

Context and Reward Model

In some embodiments, a reward model represents the predicted user engagement resulting from an explained recommendation within a given context. As highlighted above in connection with the problem formulation, the cardinality of this input space is given by equation (6) below:

$$J \times E \times X \tag{6}$$

which is far larger than can be explored exhaustively. Therefore assumptions about the structure of the reward function r are made.

One of the simplest assumptions imposes linearity on the reward model as shown below in equation 7:

$$r(j,e,x) = \sigma(\theta_{global} + \theta_j^\tau 1_j + \theta_e^\tau 1_e + \theta_x^\tau x) \tag{7}$$

where $1_i$ represents a one-hot vector of zeros with a single 1 at index i. Equation 7 combined with a cross-entropy loss function is a logistic regression model of a binary reward, such as whether or not an item was consumed. While the embodiments presented herein focus on binary outcomes, this is for convenience only. It should be understood that the binary outcomes could be replaced with more informative measures of user satisfaction by adapting the last step in the objective function accordingly (e.g., replacing sigmoid σ and cross-entropy loss with identity and a root mean squared error loss function for continuous satisfaction measures).

For convenience, all the inputs are stacked and denoted by a single augmented input vector as described below in equation 8:

$$x' = [1_j^\tau, 1_e^\tau, x^\tau]^\tau \tag{8}$$

This is performed in the same way that all the corresponding parameters are stacked. The logistic regression model is then defined according to equation 9 below:

$$r^{(1)}(j,e,x) = \sigma(\theta_{global} + \theta^\tau x') \tag{9}$$

where the aggregated context is now x' and contains information about the item, explanation, and context.

The main disadvantage of logistic regression is that the recommendations are the same for all users due to the linearity assumption. To get more personalized recommendations, in some embodiments, weighted sums of higher order interactions are introduced between elements in the aggregated context vector x'. When the weights are inner products of latent embeddings, the resulting model family is known as the factorization machine as shown in equations 10 and 11 below:

$$r^{(2)}(j,e,x) = \sigma(\theta_{global} + \theta^\tau x' + \tau_{a=1}^D \Sigma_{b>a}^D \vartheta_a^\tau \vartheta_b x'_a x'_b) \tag{10}$$

$$r^{(3)}(j,e,x) = \sigma(\theta_{global} + \theta^\tau x' + \Sigma_{a=1}^D \Sigma_{b>a}^D \vartheta_a^\tau \varepsilon_b x'_a x'_b + \Sigma_{a=1}^D \Sigma_{b>a}^D \Sigma_{C>b}^D \langle \varepsilon_a, \varepsilon_b, \varepsilon_c \rangle x'_a x'_b x'_c) \tag{11}$$

where D is the dimensionality of x, latent embeddings v are introduced, and <x,y,z> represents a sum of element-wise products of vectors x,y,z. $r^{(t)}$ is referred to as a $t^{th}$-order factorization machine.

Off-Policy Training

In some embodiments, a counterfactual risk minimization (CRM) is used to train the contextual bandit. CRM uses importance sample reweighting to target the expectation to the uniform policy when training with data from a collection policy, resulting in optimal parameters $(\hat{\theta}, \hat{\varepsilon})$ according to equations 12 and 13 below:

$$\hat{\theta}, \hat{\vartheta} = \arg_{\theta,\vartheta} \max \mathbb{E}_{A \sim Uniform(.)}[\mathbb{E}_{X,R}[\log p_{\theta,\vartheta}(R|A,X)]] \tag{12}$$

$$\approx \arg_{\theta,\vartheta} \max \frac{1}{N} \sum_{n=1}^N \frac{\text{Uniform}(a_n)}{\pi_c(a_n)} \log p_{\theta,\vartheta}(r_n|a_n,x_n) \tag{13}$$

As noted above, the variables of the equations provided herein are described above in Table 1.

Training contextual bandits requires care because if the collection policy $\pi_c$ is not uniform then the resulting objective when training a model does not match the target objective equation 12 in expectation. Furthermore, no amount of data will correct for this mismatch. Equation 13 addresses this by modifying the weight of each data point's contribution to the objective function to make it look like an expectation with respect to the uniform policy. FIG. 7 gives an example of the problem. Particularly, FIG. 7 illustrates an example of how an off-policy training fits a reward that best fits input points with respect to a target policy π using input points generated by a collection policy $\pi_c$, according to an example embodiment of the present invention.

Suppose the goal is to minimize the sum of squared errors with respect to π using data generated from $\pi_c$. Simply minimizing the sum of squared errors of the observed data points would result in the blue line but this is not the answer being sought because there are naturally more data points where $\pi_c$ is higher. This gives that region of action space more importance than other regions during the line fitting. Equation 13 informs to downweight points where $\pi_c$ is high and π is low (and vice versa) before minimizing the sum of squared errors. This results in the steeper (thicker and dashed) line.

As an example in a recommender systems context, if the deployed recommender is suggesting and explaining to a large number of users $(j_1, e_1)$ and the same item with a different explanation $(j_1, e_2)$ to a small number of users, then the logged data will reflect these proportions. Training a new model from the logged data will unduly focus on minimizing the error for explanation $e_1$ at the expense of $e_2$ even if the latter has substantially more engagement. In a totally linear discrete model, such as $r^{(1)}$ in equation (7) above when the context consists of one-hot encodings, there is no trade-off.

But any non-linear model, such as a factorization machine or neural network, will sacrifice unbiasedness for generalization.

Accordingly, in some embodiments, the collection policy $\pi_c$, is known. This is referred to as the propensity score, which is used to perform counterfactual training, which will now be described in more detail.

Exploration-Exploitation Policy & Propensity Scoring

The following example embodiments provide an exploration-exploitation approach and collection policy for propensity scoring in Bart.

When presented with context x and user u, the optimal action under the reward function is defined according to equation 14 below:

$$(j^*, e^*) = \arg_{j,e} \max r(j, e, x) \quad (14)$$

There are several exploration approaches to select from, most based on variants of Thompson sampling, upper confidence bounds, and epsilon-greedy as described in Sutton, R. S. et al., "Reinforcement learning: An Introduction", Vol. 1. MIT Press, Cambridge Mass. (1998), which is hereby incorporated by reference in its entirety. In some embodiments, the focus is on epsilon-greedy for simplicity of implementation in production and propensities.

A standard epsilon-greedy treatment of the reward function gives equal probability mass to all non-optimal items in the validity set f(e,x) and (1−ε) additional mass to the optimal action (j*,e*). The limitation of this approach is that the policy must either exploit (j*,e*) or explore the item and explanation simultaneously. If the contribution an explanation alone makes to engagement is non-zero (i.e., $\theta_e \neq 0$ if in equations 7, 9, 10 and 11 above) then this is overly exploratory as there may exist a set of effective explanations that Bart should focus on regardless of the items. Furthermore, exploring over a large number of actions results in small propensity scores. This has the effect of giving the counterfactual objective in equation 13 high variance, making training unreliable. Finally, in practice, sometimes there is a constraint that multiple items within an explanation are presented at once. This can be, for example, in implementations using a shelf interface on websites.

In light of these considerations, in some embodiments, Bart uses conditional exploration. Specifically, it decides whether to explore or exploit the items separately from the explanations, all the while keeping the same underlying reward model r that captures the interactions between items, explanations, and the context according to equations 15 and 16 below:

$$\pi_c^{item}(j|x, e) = \begin{cases} (1-\epsilon) + \frac{\epsilon}{|f(e,u)|'} & \text{if } j = j^*, j \in f(e,x) \\ \frac{\epsilon}{|f(e,u)|'} & \text{if } j \neq j^*, j \in f(e,x) \\ 0, & \text{Otherwise.} \end{cases} \quad (15)$$

where $j^* = \arg_{j_1} \max r(j_1, e, x)$ $$\pi_c^{expl.}(e|x, j) = \begin{cases} (1-\epsilon) + \frac{\epsilon}{|\epsilon|'} & \text{if } e = e^*, j \in f(e,x) \\ \frac{\epsilon}{|\epsilon|'} & \text{if } e \neq e^*, j \in f(e,x) \\ 0, & \text{Otherwise.} \end{cases} \quad (16)$$

where $e^* = \arg_{e_1} \max r(e, e_1, x)$.

Items are sampled first from $\pi_c^{item}$ for all $e_1 \in E$. Then, conditional on the items chosen, the explanation is sampled from $\pi_c^{expl}$. The overall propensity score is therefore provided by equation 17 below:

$$\pi_c = \pi_c^{item} \pi_c^{expl}. \quad (17)$$

To further address small propensities giving the objective high variance, combination of normalized importance sample reweighting and propensity score capping can be used.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, service, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

What is claimed is:

1. A method for personalizing recommendations of items with associated explanations, comprising the steps of:
    retrieving a reward model that predicts a predicted stream rate per media item and explanation pair, wherein the reward model is trained on:
        (i) a plurality of user attributes,
        (ii) at least one item attribute for each of a plurality of media items,
        (iii) implicit feedback data based on at least one activity associated with at least one of the plurality of media items, and
        (iv) a plurality of candidate explanations;
    defining, based on the reward model, a policy containing a distribution of media item and explanation pairs indicating a consumption probability for each of the media item and explanation pairs; and
    generating an ordering of the media item and explanation pairs using the policy.

2. The method according to claim 1, wherein the policy is an exploration-exploitation policy.

3. The method according to claim 1, wherein the consumption probability includes a click-through rate for the media item and explanation pair.

4. The method according to claim 1, wherein the reward model is retrained using contextual bandit retraining.

5. The method according to claim 1, further comprising the steps of:
    recording selection data at a time of selection of a media item and explanation pair from the ordering of the media item and explanation pairs, the selection data including: at least one user attribute, at least one item attribute, an item identifier, implicit feedback data, and the consumption probability for the selected media item and explanation pair; and
    updating the reward model with the recorded selection data.

6. The method according to claim 5, further comprising the step of:
    setting, after the selection of the media item and explanation pair, the probability of at least one non-optimal media item and explanation pair to greater than zero (0).

7. The method according to claim 5, further comprising the step of:
    recording a playback length of a media item corresponding to the media item and explanation pair.

8. The method according to claim 1, wherein the plurality of media items is (i) a plurality of playlists, (ii) a plurality of songs, (iii) a plurality of albums, (iv) a plurality of artists, or any combination of (i), (ii), (iii), and (iv).

9. The method according to claim 1, wherein the policy is conditioned on the plurality of user attributes, the at least one item attribute and a predicted reward for each of the media item and explanation pairs.

10. The method according to claim 1, wherein the activity is at least one of a playback action and a save action.

11. A computer system for personalizing recommendations of items with associated explanations, the computer system being configured to:
    retrieve a reward model that predicts a predicted stream rate per media item and explanation pair, wherein the reward model is trained on:
        (i) a plurality of user attributes,
        (ii) at least one item attribute for each of a plurality of media items,
        (iii) implicit feedback data based on at least one activity associated with at least one of the plurality of media items, and
        (iv) a plurality of candidate explanations;
    define, based on the reward model, a policy containing a distribution of media item and explanation pairs indicating a consumption probability for each of the media item and explanation pairs; and
    generate an order of the media item and explanation pairs using the policy.

12. The computer system according to claim 11, wherein the policy is an exploration-exploitation policy.

13. The computer system according to claim 11, wherein the consumption probability includes a click-through rate for the media item and explanation pair.

14. The computer system according to claim 11, wherein the reward model is retrained using contextual bandit retraining.

15. The computer system according to claim 11, wherein the policy is conditioned on the plurality of user attributes, the at least one item attribute and a predicted reward for each of the media item and explanation pairs.

16. The computer system according to claim 11, wherein the computer system is further configured to:
    log consumption time for a selected media item and explanation pair.

17. The computer system according to claim 11, wherein the system is further configured to:
    output the order of the media item and explanation pairs.

18. A non-transitory computer-readable medium having stored thereon instructions which, when executed by the one or more processors, cause the one or more processors to perform:

retrieving a reward model that predicts a predicted stream rate per media item and explanation pair, wherein the reward model is trained on:
(i) a plurality of user attributes,
(ii) at least one item attribute for each of a plurality of media items,
(iii) implicit feedback data based on at least one activity associated with at least one of the plurality of media items, and
(iv) a plurality of candidate explanations;
defining, based on the reward model, a policy containing a distribution of media item and explanation pairs indicating a consumption probability for each of the media item and explanation pairs; and
generating an ordering of the media item and explanation pairs using the policy.

19. The non-transitory computer-readable medium of claim 18, wherein the policy is an exploration-exploitation policy.

20. The non-transitory computer-readable medium of claim 18, wherein the consumption probability includes a click-through rate for the media item and explanation pair.

21. The non-transitory computer-readable medium of claim 18, wherein the reward model is retrained using contextual bandit retraining.

22. The non-transitory computer-readable medium of claim 18, further having stored thereon a sequence of instructions for causing the one or more processors to perform:
recording selection data at a time of selection of a media item and explanation pair from the ordering of the media item and explanation pairs, the selection data including: at least one user attribute, at least one item attribute, an item identifier, implicit feedback data, and the consumption probability for the selected media item and explanation pair; and
updating the reward model with the recorded selection data.

23. The non-transitory computer-readable medium of claim 22, further having stored thereon a sequence of instructions for causing the one or more processors to perform:
setting, after the selection of the media item and explanation pair, the probability of at least one non-optimal media item and explanation pair to greater than zero (0).

24. The non-transitory computer-readable medium of claim 22, further having stored thereon a sequence of instructions for causing the one or more processors to perform:
recording a playback length of a media item corresponding to the media item and explanation pair.

25. The non-transitory computer-readable medium of claim 18, wherein the plurality of media items is (i) a plurality of playlists, (ii) a plurality of songs, (iii) a plurality of albums, (iv) a plurality of artists, or any combination of (i), (ii), (iii), and (iv).

26. The non-transitory computer-readable medium of claim 18, wherein the policy is conditioned on the plurality of user attributes, the at least one item attribute and a predicted reward for each of the media item and explanation pairs.

27. The non-transitory computer-readable medium of claim 18, wherein the activity is at least one of a playback action and a save action.

28. A non-transitory computer-readable medium having stored thereon instructions which, when executed by the one or more processors, cause the one or more processors to perform:
retrieving a reward model, wherein the reward model is trained on:
(i) a plurality of user attributes,
(ii) at least one item attribute for each of a plurality of media items,
(iii) implicit feedback data based on at least one activity associated with at least one of the plurality of media items, and
(iv) a plurality of candidate explanations;
defining, based on the reward model, a policy containing a distribution of media item and explanation pairs indicating a consumption probability for each of the media item and explanation pairs;
generating an ordering of the media item and explanation pairs using the policy; and
retraining the reward model using contextual bandit retraining.

29. The non-transitory computer-readable medium of claim 28, wherein the policy is an exploration-exploitation policy.

30. The non-transitory computer-readable medium of claim 28, wherein the consumption probability includes a click-through rate for the media item and explanation pair.

31. The non-transitory computer-readable medium of claim 28, wherein the reward model predicts a predicted stream rate per media item and explanation pair.

32. The non-transitory computer-readable medium of claim 28, further having stored thereon a sequence of instructions for causing the one or more processors to perform:
recording selection data at a time of selection of a media item and explanation pair from the ordering of the media item and explanation pairs, the selection data including: at least one user attribute, at least one item attribute, an item identifier, implicit feedback data, and the consumption probability for the selected media item and explanation pair; and
updating the reward model with the recorded selection data.

33. The non-transitory computer-readable medium of claim 32, further having stored thereon a sequence of instructions for causing the one or more processors to perform:
setting, after the selection of the media item and explanation pair, the probability of at least one non-optimal media item and explanation pair to greater than zero (0).

34. The non-transitory computer-readable medium of claim 32, further having stored thereon a sequence of instructions for causing the one or more processors to perform:
recording a playback length of a media item corresponding to the media item and explanation pair.

35. The non-transitory computer-readable medium of claim 28, wherein the plurality of media items is (i) a plurality of playlists, (ii) a plurality of songs, (iii) a plurality of albums, (iv) a plurality of artists, or any combination of (i), (ii), (iii), and (iv).

36. The non-transitory computer-readable medium of claim 28, wherein the policy is conditioned on the plurality of user attributes, the at least one item attribute and a predicted reward for each of the media item and explanation pairs.

37. The non-transitory computer-readable medium of claim 28, wherein the activity is at least one of a playback action and a save action.

38. A method for personalizing recommendations of items with associated explanations, comprising the steps of:
retrieving a reward model, wherein the reward model is trained on:
(i) a plurality of user attributes,
(ii) at least one item attribute for each of a plurality of media items,
(iii) implicit feedback data based on at least one activity associated with at least one of the plurality of media items, and
(iv) a plurality of candidate explanations;
defining, based on the reward model, a policy containing a distribution of media item and explanation pairs indicating a consumption probability for each of the media item and explanation pairs;
generating an ordering of the media item and explanation pairs using the policy; and
retraining the reward model using contextual bandit retraining.

39. The method according to claim 38, wherein the policy is an exploration-exploitation policy.

40. The method according to claim 38, wherein the consumption probability includes a click-through rate for the media item and explanation pair.

41. The method according to claim 38, wherein the reward model predicts a predicted stream rate per media item and explanation pair.

42. The method according to claim 38, further comprising the steps of:
recording selection data at a time of selection of a media item and explanation pair from the ordering of the media item and explanation pairs, the selection data including: at least one user attribute, at least one item attribute, an item identifier, implicit feedback data, and the consumption probability for the selected media item and explanation pair; and
updating the reward model with the recorded selection data.

43. The method according to claim 42, further comprising the step of:
setting, after the selection of the media item and explanation pair, the probability of at least one non-optimal media item and explanation pair to greater than zero (0).

44. The method according to claim 42, further comprising the step of:
recording a playback length of a media item corresponding to the media item and explanation pair.

45. The method according to claim 38, wherein the plurality of media items is (i) a plurality of playlists, (ii) a plurality of songs, (iii) a plurality of albums, (iv) a plurality of artists, or any combination of (i), (ii), (iii), and (iv).

46. The method according to claim 38, wherein the policy is conditioned on the plurality of user attributes, the at least one item attribute and a predicted reward for each of the media item and explanation pairs.

47. The method according to claim 38, wherein the activity is at least one of a playback action and a save action.

48. A computer system for personalizing recommendations of items with associated explanations, the computer system being configured to:
retrieve a reward model, wherein the reward model is trained on:
(i) a plurality of user attributes,
(ii) at least one item attribute for each of a plurality of media items,
(iii) implicit feedback data based on at least one activity associated with at least one of the plurality of media items, and
(iv) a plurality of candidate explanations;
define, based on the reward model, a policy containing a distribution of media item and explanation pairs indicating a consumption probability for each of the media item and explanation pairs;
generate an order of the media item and explanation pairs using the policy; and
retrain the reward model using contextual bandit retraining.

49. The computer system according to claim 48, wherein the policy is an exploration-exploitation policy.

50. The computer system according to claim 48, wherein the consumption probability includes a click-through rate for the media item and explanation pair.

51. The computer system according to claim 48, wherein the reward model predicts a predicted stream rate per media item and explanation pair.

52. The computer system according to claim 48, wherein the computer system is further configured to:
record selection data at a time of selection of a media item and explanation pair from the ordering of the media item and explanation pairs, the selection data including: at least one user attribute, at least one item attribute, an item identifier, implicit feedback data, and the consumption probability for the selected media item and explanation pair; and
update the reward model with the recorded selection data.

53. The computer system according to claim 52, wherein the computer system is further configured to:
set, after the selection of the media item and explanation pair, the probability of at least one non-optimal media item and explanation pair to greater than zero (0).

54. The computer system according to claim 52, wherein the computer system is further configured to:
record a playback length of a media item corresponding to the media item and explanation pair.

55. The computer system according to claim 48, wherein the plurality of media items is (i) a plurality of playlists, (ii) a plurality of songs, (iii) a plurality of albums, (iv) a plurality of artists, or any combination of (i), (ii), (iii), and (iv).

56. The computer system according to claim 48, wherein the policy is conditioned on the plurality of user attributes, the at least one item attribute and a predicted reward for each of the media item and explanation pairs.

57. The computer system according to claim 48, wherein the activity is at least one of a playback action and a save action.

58. The computer system according to claim 48, wherein the computer system is further configured to:
log consumption time for a selected media item and explanation pair.

59. The computer system according to claim 48, wherein the system is further configured to:
output the order of the media item and explanation pairs.

60. The computer system according to claim 11, wherein the computer system is further configured to:
record selection data at a time of selection of a media item and explanation pair from the ordering of the media item and explanation pairs, the selection data including: at least one user attribute, at least one item attribute, an item identifier, implicit feedback data, and the consumption probability for the selected media item and explanation pair; and update the reward model with the recorded selection data.

61. The computer system according to claim 60, wherein the computer system is further configured to:

set, after the selection of the media item and explanation pair, the probability of at least one non-optimal media item and explanation pair to greater than zero (0).

62. The computer system according to claim 60, wherein the computer system is further configured to:

record a playback length of a media item corresponding to the media item and explanation pair.

* * * * *